United States Patent [19]

Deschamps et al.

[11] 3,716,620

[45] Feb. 13, 1973

[54] PROCESS FOR REMOVING TRACES OF HYDROGEN SULFIDE AND MERCAPTANS FROM GASES

[75] Inventors: Andre Deschamps, Chatou; Sigismond Franckowiak, Montesson; Philippe Renault, Noisy le Roi, all of France

[73] Assignee: Institut Francais Du Petrole Des Carburants Et Lubrificants, Rueil Malmaison (Hauts de Seine), France

[22] Filed: Oct. 27, 1970

[21] Appl. No.: 84,497

[30] Foreign Application Priority Data

Nov. 4, 1969  France..................................6937967

[52] U.S. Cl...................................................423/228

[51] Int. Cl. .............................................B01d 53/16
[58] Field of Search ........23/2 R, 152, 3 R, 181, 224, 23/225 R

[56] References Cited

UNITED STATES PATENTS

| | | | |
|---|---|---|---|
| 1,034,646 | 8/1912 | Rabenalt.............................23/2 R X |
| 1,890,874 | 12/1932 | Weston ..................................23/152 |
| 3,607,004 | 9/1971 | Deschamps et al......................23/2 R |

*Primary Examiner*—Earl C. Thomas
*Attorney*—Millen, Raptes and White

[57] ABSTRACT

A process for purifying a gas containing hydrogen sulfide or a mercaptan, wherein said gas is contacted with a solution of iodine in an organic solvent, said organic solvent also containing an amine.

16 Claims, No Drawings

PROCESS FOR REMOVING TRACES OF HYDROGEN SULFIDE AND MERCAPTANS FROM GASES

This invention has for an object the removal, in a practically complete manner, traces of hydrogen sulfide ($H_2S$) and/or mercaptans from gases.

Some gases, either natural or synthetic, contain these constituents in too low amounts for justifying a conventional purification by washing with amines or alkanolamines. When applied to gases which contain larger amounts of these impurities, these sweetening treatments result in the production of gases which have a content of $H_2S$ and mercaptans of a few tens or hundreds of parts per million (ppm). These gases must be subjected to finishing treatments in some cases.

One known process consists of oxidizing hydrogen sulfide to sulfur and mercaptans to disulfides by means of iodine dissolved in a particular organic solvent, such as defined hereinafter. The iodine solution may be regenerated thereafter by means of an appropriate oxidant.

This process has substantial advantages with respect to the same reaction, when carried out in the aqueous phase, particularly lower iodine or hydroiodic acid losses, easy recovery of sulfur.

It has now been observed that, when there is used a solution of iodine in an organic solvent, for example one of those hereinafter mentioned, the reaction velocity may be considerably increased by the use of small amounts of basic compounds.

The inorganic bases are usually insufficiently soluble in these solvents to have a significant effect. The organic bases are preferred, particularly amines, for example :

the aliphatic primary, secondary or tertiary monoamines (including the cyclo-aliphatic amines), for example those containing three–60 carbon atoms, for example n-butylamine, dioctylamine, trilaurylamine, cyclohexylamine, dicycloheptylamine, N-methyl N-isopropyl amine, the aromatic monoamines, containing for example six to 12 carbon atoms, for example aniline, toluidines, xylidines and α-naphthylamine, the pyrrolines, pyrrolidines, piperidines, N-alkyl pyrrolines, N-alkyl pyrrolidines and N-alkyl piperidines having for example from four to 12 carbon atoms, the alkanolamines with primary, secondary or tertiary amine groups having for example from two to 12 carbon atoms and 1 to 3 amine groups, for example the mono-, di- and tri-ethanolamines, N-methyl diethanolamine, N-cyclohexyl-dipropanolamine or di-isopropanolamine, these alkanolamines having for example from one to four OH groups, the aliphatic or aromatic diamines having for example from two to 10 carbon atoms, for example hexamethylene diamine, octamethylene diamine, piperazine, paraphenylene diamine, 1,4-diamino naphthalene and 1,8-diamino naphthalene.

Aliphatic or aromatic triamines or tetraamines may also be used, for example 1,3,5-triamino benzene and 2,3,6,7-tetra-amino naphthalene, these triamines or tetraamines having for example from two to 10 carbon atoms.

Among these compounds, the preferred ones are the alkanolamines, for example diethanolamine or N-methyl diethanolamine.

The amine concentration may vary broadly, for example from 0.05 to 10 percent by weight, with respect to the reaction liquid phase.

However since the activity of the amine is great at high dilutions and does not increase with its concentration, low concentrations are preferred, preferably from 0.1 to 1 percent by weight.

The solutions of iodine in the organic solvents of this invention may contain small amounts of water, for example from 0 to 25 percent by weight and preferably from 0.1 to 1 percent by weight, the iodine concentration being preferably in the range of 0.005 to 1 mol. per liter. Water in small amounts increases the reaction velocity.

Among the organic solvents of this invention, the following may be used :

1- the alkyl-, cycloalkyl- or aryl- sulfoxides, for example those of the formula :

$$R_1 - SO - R_2$$

in which $R_1$ and $R_2$, which may be identical or not, are hydrocarbon monovalent radicals, for example alkyl radicals having from 1 to 20 and preferably from one to three carbon atoms, cycloalkyl radicals having for example from three to 20 carbon atoms or aryl radicals having for example from 6 to 20 carbon atoms. The $R_1$ and $R_2$ radicals may also be linked together to form an alkylene radical preferably containing four to 12 carbon atoms, thus resulting in a ring comprising the sulfur atom.

By way of non-limitative examples of this class, the following have been found satisfactory:

dimethyl sulfoxide, diethyl sulfoxide, dipropyl sulfoxide, dibutyl sulfoxide, methylethyl sulfoxide, dicyclohexyl sulfoxide, methylcyclohexyl sulfoxide, diphenyl sulfoxide, ethylphenyl sulfoxide, cyclohexylphenyl sulfoxide and tetramethylene sulfoxide.

Dimethyl sulfoxide is preferred in this first class of solvents.

2- The glycols, polyethylene glycols, polyalkylene glycols, ethers and/or esters of glycols and polyalkylene glycols, for example the compounds of formula :

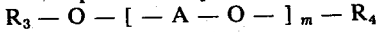

$$R_3 - O - [ - A - O - ]_m - R_4$$

in which :

A is an alkylene radical, either branched or not, having for example two to 15 carbon atoms and preferably two to five.

$R_3$ and $R_4$, either identical or not, are hydrogen atoms, hydrocarbon monovalent radicals having for example from 1 to 20 and preferably from one to five carbon atoms, for example alkyl, cycloalkyl or aryl radicals, or acyl radicals $R' - CO -$ in which $R'$ is defined as $R_3$ or $R_4$, except acyl.

m is an integer, for example from 1 to 20 and preferably from 1 to 10.

By way of non-limitative examples, the following have been found satisfactory :

glycol, diethylene glycol, heptaethylene glycol, decaethylene glycol, 1,3-propylene glycol, hepta-(1,3-propylene glycol), tetra (1,4-butylene glycol), polyethylene glycol of mol. weight 400, triethylene glycol mono-butyl ether acetate, tri-(1,3-propylene glycol) monophenyl ether, triethylene glycol diacetate.

The preferred ones are the polyethylene glycols and the mono-alkyl ethers thereof.

3- The aromatic hydrocarbons or ethers which are liquid at the absorption temperature, for example benzene, toluene, ortho-xylene, meta-xylene, ethyl-benzene, para-ethyl toluene, diphenyl ether, these hydrocarbons or ethers containing, for example, from six to 12 carbon atoms.

the amides, N-alkyl amides and N,N-dialkylamides having for example 1 to 6 carbon atoms, for example formamide, N,N-dimethyl formamide, N-methyl N-ethyl formamide, acetamide, N,N-dimethyl acetamide or N-propyl propionamide, pyrrolidones, piperidones, N-alkyl pyrrolidones and N-alkyl piperidones having four to 12 carbon atoms, for example 2-pyrrolidone, N-methyl pyrrolidone, N-ethyl pyrrolidone or N-methyl piperidone.

sulfones having 4-1⁴ carbon atoms, for example cyclotetramethylene sulfone, diethylsulfone or ethyl isoheptyl sulfone, phosphoric esters having six-30 carbon atoms, particularly those of formula

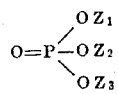

in which $Z_1$, $Z_2$ and $Z_3$ are monovalent hydrocarbon radicals having each from one to 15 carbon atoms, for example tributyl phosphate, triisobutyl phosphate, triphenyl phosphate, tricresyl phosphate and n-propyl dimethyl phosphate, hexaalkylphosphorotriamides in which the alkyl radicals have each 1-5 carbon atoms, for example hexamethylphosphotriamide, carboxylic esters containing three-24 carbon atoms, for example amyl acetate, ethyl benzoate or ethyl malonate these esters being esters of monohydric alcohols, as compared to esters of glycols.

A mixture of two or more of these compounds may also be used.

According to this process, traces of hydrogen sulfide and/or mercaptans may be completely removed from a gas by mere washing, for example at a pressure of 0.1 to 100 kg/cm² and a temperature of, for example, 10 to 80°C and preferably 20° to 40°C, without contaminating the gas with new impurities and without appreciable loss of iodine.

Any known apparatus allowing a contact between the organic iodine solution and the gas may be used, for example a tray column or a packed column.

When at least one large part of iodine has been transformed, iodine may be regenerated in the solution by any convenient oxidation process, for example:

by adding oxidizing agents such as hydrogen peroxide, sodium hypochlorite, ammonium persulfate, ammonium perborate or potassium permanganate,
by bubbling oxygen, ozone, air or ozonized air,
by electrochemical oxidation,
by catalytic oxidation.

The regeneration may also be carried out in situ, in the reaction zone, using simultaneously iodine and an oxidizing agent, preferably an oxidizing agent in liquid phase.

The regeneration with an oxidant of the sodium hypochlorite type will only be used with profit when the iodine solvent is not miscible or is only partially miscible with water (for example an aromatic hydrocarbon). This avoids the accumulation of a salt such as sodium chloride in the solvent. On the contrary, air and oxygen peroxide may be used irrespective of the miscibility or non-miscibility of the solvent with water.

The following examples are given by way of illustration.

EXAMPLE 1

Three hundred ccm of a solvent containing 0.01 mol. of iodine per liter are introduced into a column having perforated plates.

At the bottom of the column, nitrogen containing 1,000 parts by volume of $H_2S$ per million is injected at a rate of 500 liters per hour.

The concentration of $H_2S$ in the gas withdrawn from the column is determined.

Several experiments have been carried with each solvent, with or without amine.

The following table shows the influence of the amine on the gas purification rate. The $H_2S$ content of the purified gas is given in parts per million (ppm).

| Solvent | $H_2S$ content of the purified gas | | | | |
|---|---|---|---|---|---|
| | without amine | 1% diethanolamine b.w. | 1% n-butyl-amine b.w. | 1% toluidine b.w. | 1% tetramethylene diamine b.w. |
| Triethylene glycol monoethyl ether | 200 | <5 | | 20 | |
| Dimethyl-sulfoxide | 10 | <5 | | | |
| Xylenes | 300 | | 25 | 10 | |
| Dimethyl-formamide | 10 | <5 | | | |
| N-methyl-pyrrolidone | 250 | <5 | | | 10 |
| Cyclotetramethylene sulfone | 250 | <5 | | | |
| Tri-n.butyl phosphate | 250 | <5 | <5 | 10 | |
| Hexamethyl phosphorotriamide | 150 | <5 | | | |
| Amyl acetate | 300 | | | 20 | |

EXAMPLE 2

Example 1 has been repeated with other solvents and other amines used at a rate of 0.5 percent by weight. The $H_2S$ contents of the purified gases are given hereafter:

| Solvent | Amine | $H_2S$ content (ppm) of the purified gas |
|---|---|---|
| Polyethylene glycol of mol. weight 250 | dicycloheptylamine | 30 |
| Triethylene glycol diacetate | α - naphthylamine | 10 |
| Diphenyl oxide | 2-pyrrolidone | 35 |
| N- propyl propionamide | N-methyl piperidine | 20 |
| Acetamide | N-cyclohexyl dipropanolamine | <5 |
| N-methyl | 1,4-diamino naphthalene | 15 |

| solvent | amine | |
|---|---|---|
| piperidone Diethylsulfone | 1,3,5-triamino benzene | 20 |
| n-propyl dimethyl phosphate | N-methyl diethanolamine | <5 |

EXAMPLE 3

Example 1 has been repeated except that $H_2S$ was substituted with 1,000 ppm of various mercaptans and the solvents contained 0.5 percent by weight of amines.

The mercaptan content of the purified gas was as follows:

| solvent | amine | mercaptan content | mercaptan of the purified gas ppm |
|---|---|---|---|
| triethylene glycol monoethyl ether | diethanolamine | ethyl mercaptan | 10 |
| dimethyl acetamide | xylidine | n-butyl mercaptan | 20 |
| tri-n.butyl phosphate | n. butylamine | methylmercaptan | 10 |

This invention is particularly useful for treating a gas having a low content of $H_2S$ or mercaptans, for example 0.001 to 1 percent by volume; however it may be applied successfully to a gas having a higher content of $H_2S$, for example up to 20 % by volume. Such gases as $CO_2$, $N_2$, $CH_4$ and $H_2$ which are substantially inert with respect to iodine may be present without inconvenience.

This process applies to all types of gas containing hydrogen sulfide or mercaptans, for example refinery gas, natural gas or gases from Claus ovens.

What is claimed as this invention is :

1. A process for purifying a gas containing hydrogen sulfide or a mercaptan, wherein said gas is contacted with a solution of iodine in an organic solvent, said organic solvent also containing an amine, said organic solvent being selected from the group consisting of sulfoxides; glycols, ethers, and esters thereof; aromatic hydrocarbons; aromatic ethers; amides; pyrrolidones; piperidones; sulfones; phosphoric acid esters of 6-30 carbon atoms; carboxylic acid esters of 3-24 carbon atoms of monohydric alcohols, and mixtures thereof.

2. The process of claim 1, wherein the amine is an aliphatic or aromatic mono-, di- or tri-amine, a pyrroline, a pyrrolidine, a piperidine or an alkalonamine.

3. The process of claim 2, wherein the amine is an alkanolamine containing two–12 carbon atoms, 1–3 amine groups and one–four OH groups.

4. The process of claim 3, wherein the amine is diethanolamine.

5. The process of claim 1, wherein the amine concentration is 0.05 to 10 percent by weight, with respect to the reaction liquid phase.

6. The process of claim 1, wherein the amine concentration is 0.1 to 1 percent by weight, with respect to the reaction liquid phase.

7. The process of claim 1, wherein the iodine concentration is 0.005–1 mol. per liter of reaction liquid phase.

8. The process of claim 1, wherein the iodine solution contains 0.1–1 percent by weight of water.

9. The process of claim 1, wherein the temperature is 10°–80C and the pressure 0.1–100 $kg/cm^2$.

10. The process of claim 1, wherein the impoverished iodine solution is regenerated by contact with an oxidation agent.

11. The process of claim 10, wherein the oxidation agent is hydrogen peroxide, sodium hypochlorite, ammonium persulfate, ammonium perborate, potassium permanganate, oxygen or ozone.

12. The process of claim 10, wherein the impoverished iodine solution is regenerated by electrochemical oxidation.

13. A process as defined by claim 1 wherein said organic solvent is dimethyl sulfoxide.

14. A process as defined by claim 1 wherein said organic solvent is selected from the group consisting of polyethylene glycol and monoalkyl ethers thereof.

15. A process as defined by claim 1 wherein said organic solvent is selected from the group consisting of dimethyl formamide and acetamide.

16. A process as defined by claim 1 wherein said organic solvent is selected from the group consisting of n-propyl dimethyl phosphate and tri-butyl phosphate.

* * * * *